Dec. 20, 1949  B. P. BAKER ET AL  2,491,945
CIRCUIT INTERRUPTER

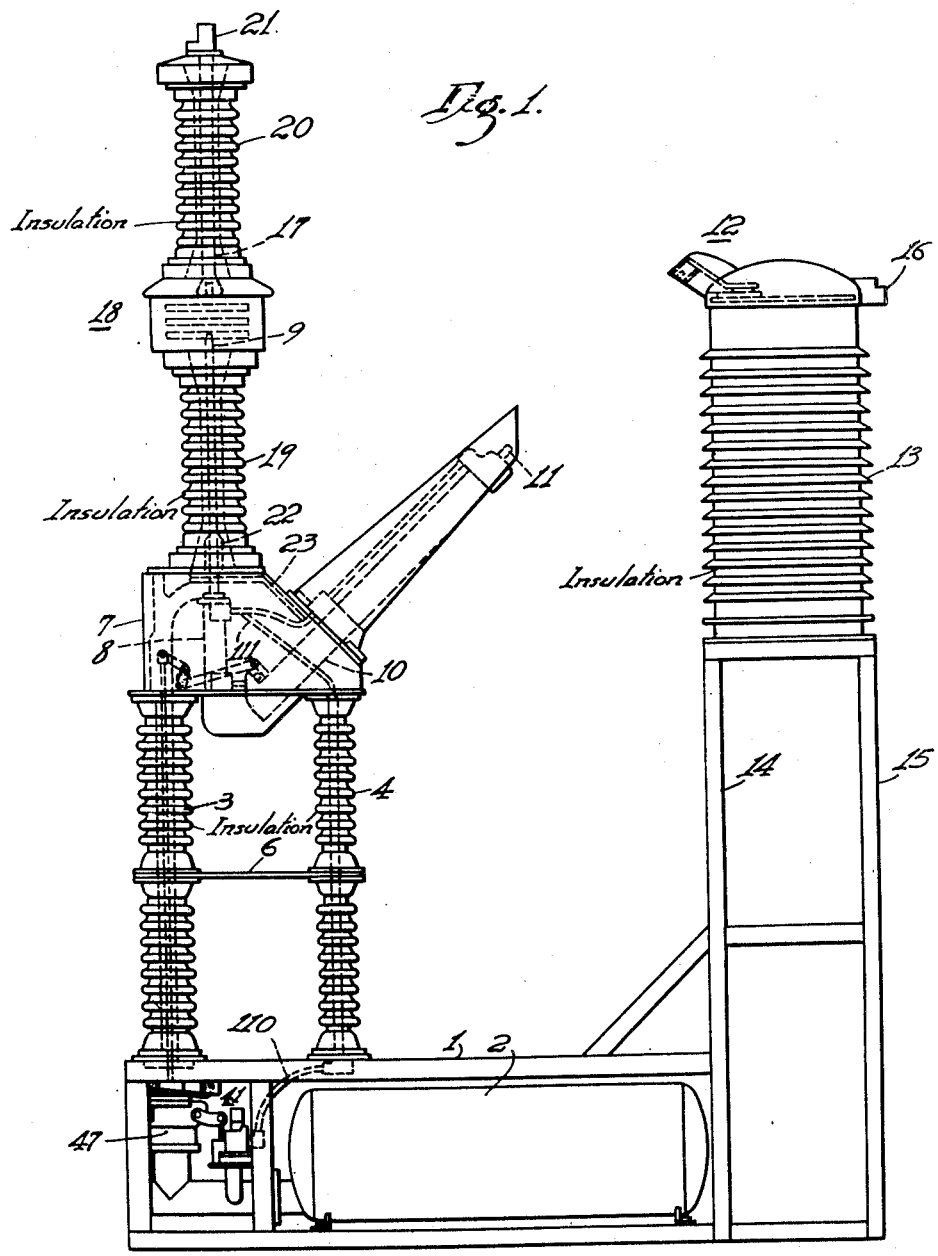

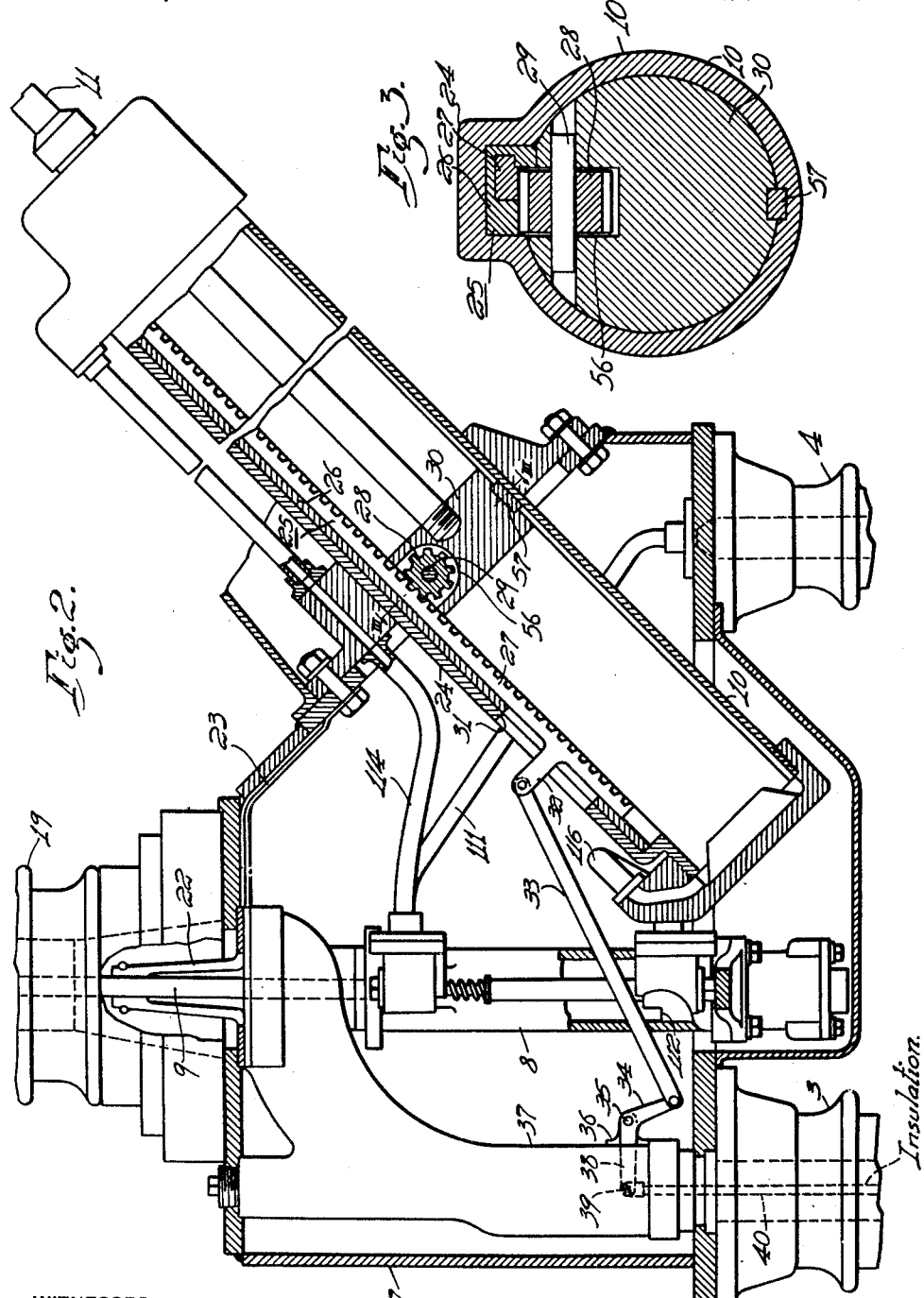

Filed Nov. 13, 1945  5 Sheets-Sheet 3

INVENTORS
Benjamin P. Baker and
Herbert J. Webb.
BY
Ralph H. Swingle
ATTORNEY

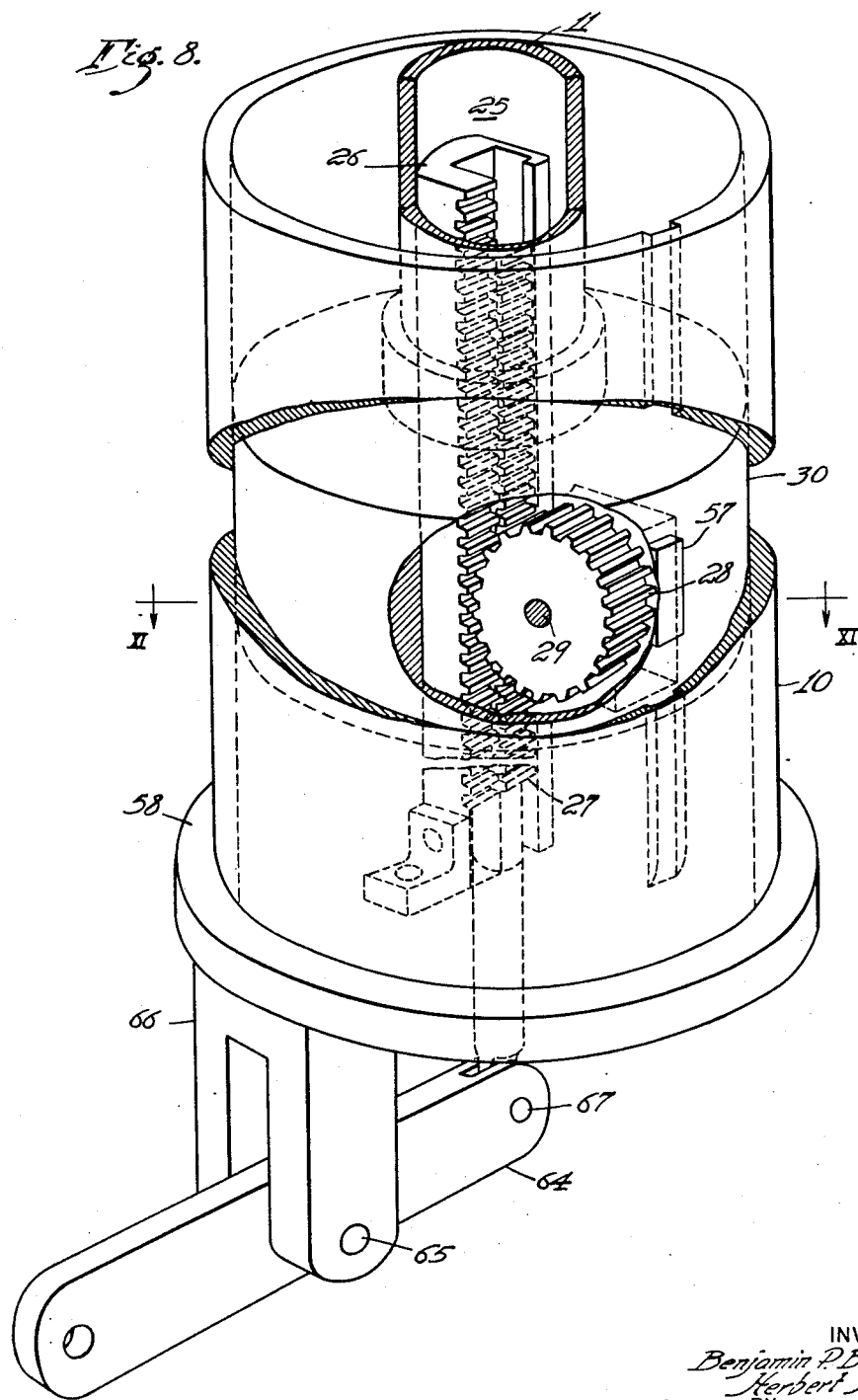

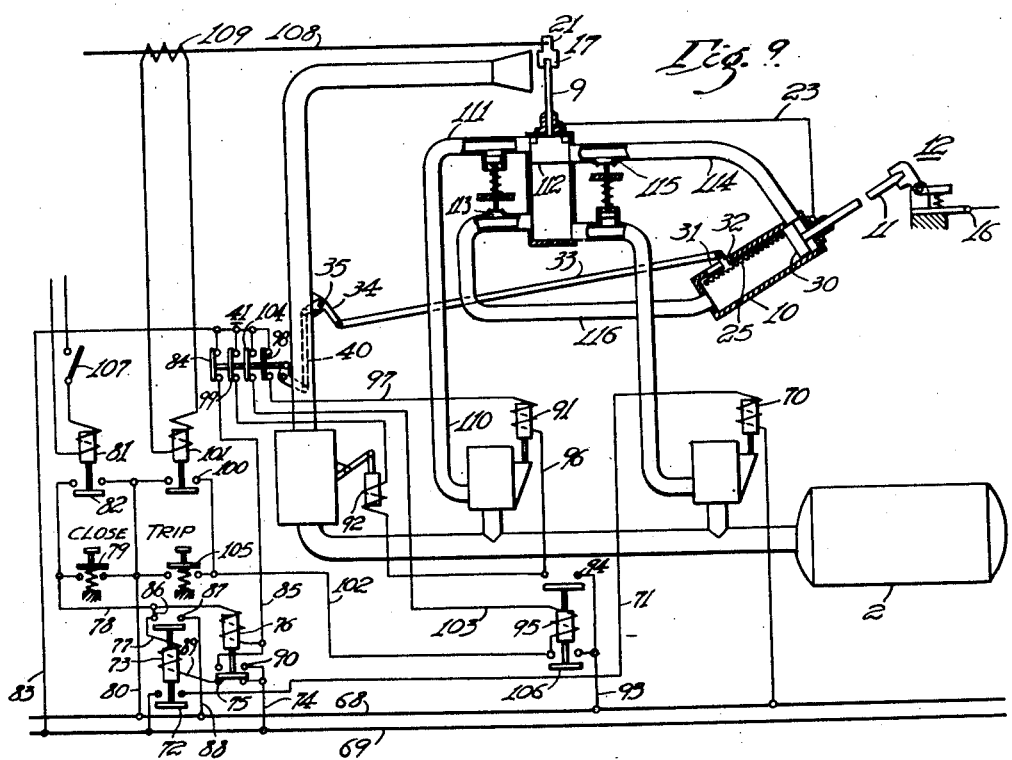
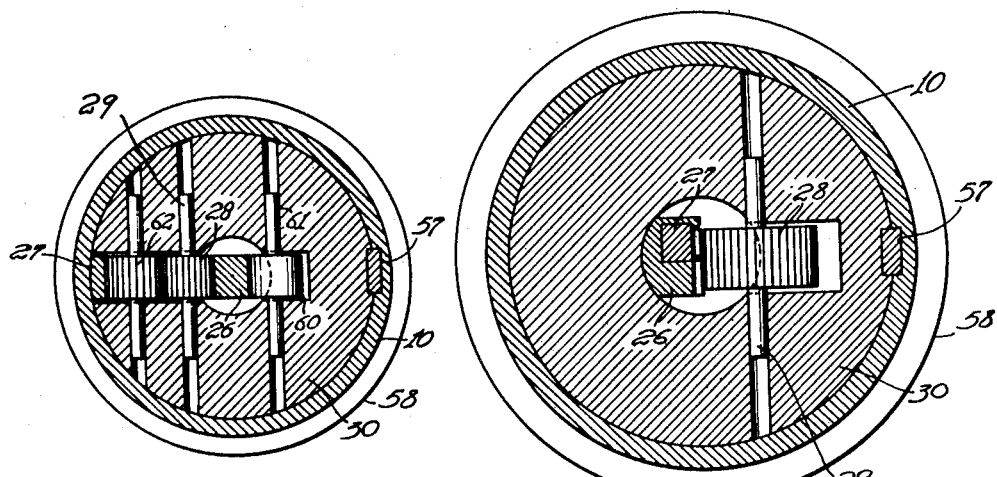

Patented Dec. 20, 1949

2,491,945

UNITED STATES PATENT OFFICE

2,491,945

CIRCUIT INTERRUPTER

Benjamin P. Baker, Turtle Creek, Pa., and Herbert J. Webb, Randolph, Mass., assignors to Westinghouse Electric Corporation, East Pittsburgh, Pa., a corporation of Pennsylvania Application November 13, 1945, Serial No. 628,288

7 Claims. (Cl. 200—81.4)

This invention relates to circuit interrupters in general and, more particularly, to circuit interrupters of the gas-blast type in which fluid under pressure is employed to effect extinction of the arc and to effect operation of the mechanism utilized to bring about contact motion.

A more specific object is to provide an improved mechanism for interrelating the motion of a contact in a circuit interrupter with an auxiliary switch, the latter being used in the control circuit. It is necessary that the auxiliary switch accurately indicate the position of the movable contact.

Another object is to provide an improved circuit interrupter of the type having a pair of cooperable interrupting contacts and a pair of serially related disconnect contacts. We provide an improved differential gear mechanism interrelating the motion of one of the disconnect contacts with the motion of a control switch employed in the control circuit of the interrupter.

It is necessary in outdoor compressed air circuit breakers with synchronized disconnect switches to link the motion of the disconnect switch to an auxiliary switch which operates the electrical control system of the circuit breaker. This auxiliary switch must be mounted on the circuit breaker frame at ground potential and must be linked to the disconnect switch, which may be at high potential, through an insulating rod and suitable mechanical linkage. Our disclosure relates, specifically, to an improved method of linking the motion of the disconnect contact rod to the insulating rod which operates the auxiliary switch.

In one form of construction although the disconnect contact rod travel may be as great as 45 inches, the travel of the insulating auxiliary switch operating rod may be only 4 inches. Consequently, it is apparent that a mechanism affording a high reduction of motion is necessary. It is also important that clearances are as small as possible so that the back-lash by the auxiliary switch operating rod and the disconnect contact rod is kept to a minimum. This is an especially important factor in outdoor compressed air breakers because the auxiliary switch is designed to shut off blast air at a predetermined point during disconnect contact travel. If the cut-off point is shifted backwards because of back-lash, it is possible that the interrupting blast air would be turned off before the disconnect contact is opened sufficiently to withstand the applied voltage, with consequent danger of restriking. On the other hand, if back-lash delays the closing of the blast valve, valuable air is lost, decreasing the possible number of operations of the breaker per air storage tank charge.

It is an object of our invention to provide an improved mechanism which will serve to interrelate motion or operation of the auxiliary switch with the motion or operation of the movable disconnect contact. It is to be understood, however, that our invention not only has application to compressed gas circuit interrupters of the type having a pair of arcing contacts and a pair of serially related disconnect contacts, but also has application to a circuit interrupter of the type having only a pair of cooperable contacts and in which it is desired to interrelate motion of one of the contacts with motion of an auxiliary switch, the latter being employed in the control circuit.

Further objects and advantages will readily become apparent upon a reading of the following specification, taken in conjunction with the drawings, in which:

Figure 1 is a side-elevational view of a compressed-gas type of circuit interrupter embodying our invention and shown in the fully open circuit position;

Fig. 2 is an enlarged vertical sectional view through the operating casing of the circuit interrupter of Fig. 1, the movable arcing contact being in its fully open circuit position and the movable disconnect contact being approximately half way open;

Fig. 3 is a fragmentary sectional view taken along the line III—III of Fig. 2;

Fig. 8 is a perspective view illustrating another modification of our invention, the movable disconnect contact being partly open;

Fig. 9 is a diagrammatic view of the electrical control circuit of the circuit interrupter;

Fig. 10 is a sectional view taken along the line X—X of Fig. 7; and

Fig. 11 is a sectional view taken along the line XI—XI of Fig. 8.

Figure 4:
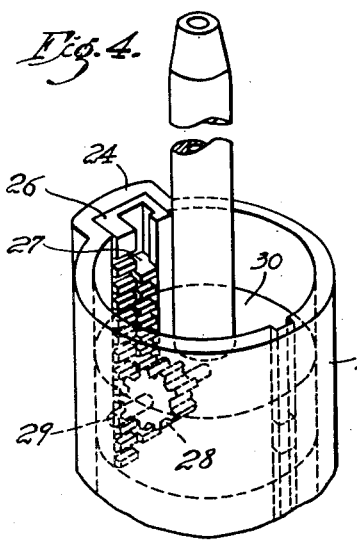
Fig. 4 is a fragmentary perspective view of the mechanism shown in Fig. 2 to illustrate the principle of operation thereof.

Referring to the drawings, and more particularly to Fig. 1 thereof, the reference numeral 1 designates a frame composed of structural steel members, which supports a tank 2 containing a suitable arc extinguishing fluid such as compressed air under pressure.

A suitable motor-driven compressor unit (not shown) may be employed for maintaining the fluid within the tank 2 at the proper pressure. Supported by the frame 1 are three insulators columns only two of which, 3 and 4, are shown.

The three insulator columns may be braced by a brace 6. The three insulator columns support at their upper ends a metallic casing 7 within which is disposed the operating cylinder 8 of the movable arcing contact 9 and the operating cylinder 10 for the movable disconnect contact 11. The movable disconnect contact 11 makes engagement in the closed circuit position (not shown) with a stationary disconnect contact, generally designated by the reference numeral 12. The stationary disconnect contact 12 is supported at the top of a cylinderical insulator 13 within which may be disposed suitable metering equipment. The insulator column 13 is supported by structural steel members 14, 15 suitably welded at their lower ends to the frame 1. The reference numeral 16 designates the right-hand line terminal of the interrupter.

Cooperable with the movable arcing contact 9 is a stationary arcing contact 17. The arc which is drawn upon separation of the movable arcing contact 9 from the stationary arcing contact 17 is drawn within a suitable arc-extinguishing structure 18, which may assume any desired form but which is preferably of the construction set forth and claimed in United States patent application, Serial No. 373,856, filed January 9, 1941, by Leon R. Ludwig and Benjamin P. Baker, now United States Patent No. 2,313,159, which issued March 9, 1943 and is assigned to the assignee of this application.

The arc extinguisher 18 supported on the column 19 in turn supports an insulator column 20, at the upper end of which is disposed the left-hand line terminal 21 of the interrupter.

Thus, in the closed circuit position of the interrupter (not shown), the circuit therethrough extends from the left-hand line terminal 21 through the stationary arcing contact 17, movable arcing contact 9, slider connector 22, conducting strap 23, movable disconnect contact 11, stationary disconnect contact 12 through any metering equipment which may be provided in the insulator column 13 to the right-hand terminal 16 of the interrupter. During the opening operation the arcing contacts are arranged to separate first, and only after the arc is extinguished does the movable disconnect contact 11 separate from the stationary disconnect contact 12. This proper sequencing of the contact structure during the opening operation is brought about by a novel mechanism set forth and claimed in United States patent application, Serial No. 431,394 filed February 18, 1942 by Leon R. Ludwig, Benjamin P. Baker and Andrew H. Bakken now Patent Number 2,394,086, issued February 5, 1946, and assigned to the assignee of the instant application. Thus, in the fully open circuit position of the interrupter as shown in Fig. 1, the movable arcing contact 9 is separated from the stationary arcing contact 17 and the movable disconnect contact 11 is separated from the stationary disconnect contact 12 to introduce an isolating gap in the circuit.

During the closing operation, the arcing contacts 9, 17 make contacting engagement before engagement of the disconnect contacts 11 and 12. The proper sequencing during the closing operation is also brought about by novel mechanism set forth and claimed in United States patent application Serial No. 431,394, referred to above.

Figure 5:
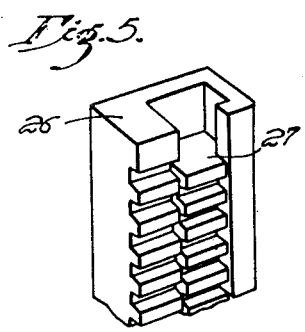
Fig. 5 is a fragmentary perspective view of the differential gear rack which we employ, showing the differential pitch in the two racks.

Referring to Fig. 2, which in conjunction with Figs. 3, 4 and 5 collectively illustrates our preferred embodiment, it will be observed that the operating cylinder 10 for the movable disconnect contact 11 has a longitudinally extending projecting portion 24 formed therein (see Fig. 3) in which is positioned differential gear means, generally designated by the reference numeral 25 and consisting of a stationary gear rack 26 and a movable differential gear rack 27. A spur gear 28 mounted on a pin 29 and movable with the movable disconnect piston 30 makes engagement with both racks. Thus, the disconnect cylinder 10 is longitudinally grooved the entire length of one side to accommodate a set of differential gear racks. One rack 26, rigidly mounted in and running the entire length of the cylinder, has machined in it a groove in which is slidably mounted the movable rack 27. The movable rack 27 is shorter than the stationary rack 26 by the desired amount of auxiliary switch operating rod travel. On the outside of the cylinder 10, directly in the rear of the movable rack 27 and at any convenient longitudinal location, is machined a slot 31 which is as long as the desired travel. A projection 32, integrally formed with the movable rack 27, moves in the slot 31 and affords a means of attaching the auxiliary switch linkage as shown.

More specifically, the auxiliary switch linkage includes the link 33 connected at its left-hand end by a pivotal connection with an arm 34 rigidly secured to a pin 35. The pin 35 is mounted in a bracket 36 to the wall of a blast tube 37. An arm 38 disposed in the interior of the blast tube 37 has its right-hand end rigidly secured to the pin 35. Connected to the left-hand end of the arm 38 by a pivotal connection 39 is an insulating rod 40, which extends downwardly through the insulator column 3 in a manner more clearly shown in Fig. 1.

Figure 6:
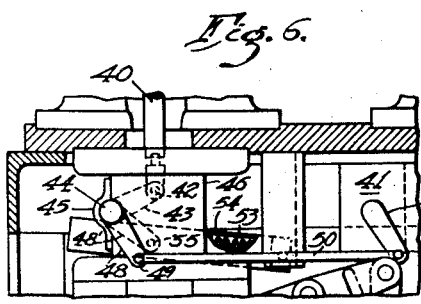
Fig. 6 is a fragmentary partly vertical sectional view of the auxiliary switch and the linkage connected thereto.

Referring to Fig. 6, which shows more clearly than Fig. 1 the auxiliary switch 41, it will be observed that the lower end of the rod 40 makes pivotal connection at 42 to an arm 43 which is rigidly secured to a pin 44. The pin 44 is supported by a bracket 45 to the outside wall of a tube 46, which leads to the blast valve 47. Secured to the pin 44 exteriorly of the tube 46 is an arm 48 which makes pivotal connection adjacent its lower end at 49 to a link 50, the right-hand end of which makes pivotal connection at 51 to an arm 52, the latter serving to operate the auxiliary switch 41.

Thus movement of the projection 32 effects, through the rotation of the several arms and links aforementioned, the operation of the auxiliary switch 41. If desired, the rod 40 may be put under tension to prevent whipping by employing a tension spring 53 disposed in a guide tube 54 operatively coupled by a connection at 55 to a crank arm 48' fixed to the pin 44. The spring 53 may be arranged to bias the link 50 toward the left as viewed in Fig. 6 to bias the pin 44 in a clockwise direction, thus placing the rod 40 under tension.

The stationary rack 26 has a different pitch (number of teeth per inch) than the movable rack 27. The racks are simultaneously engaged by the spur gear 28 mounted in a milled groove 56 in the piston 30. The piston 30, itself, is keyed on the opposite side at 57 to prevent its rotation and consequent disengagement of the spur gear 28 from the racks 26, 27. Let us suppose that the pitch of the stationary rack and of the spur gear is 9 and that the pitch of the movable rack is 10 as exaggeratedly shown in Fig. 5. If the piston 30 and spur gear 28 move one inch, nine teeth have been engaged in both racks 26, 27. However, nine teeth represent one inch on the stationary rack 26 and only nine-tenths of an inch on the movable rack 27. Therefore, the movable rack 27 moves one-tenth of an inch for every inch of piston travel. Obviously, any reasonable reduction ratio may be used.

From the above description it will be apparent that we have employed differential gear means interrelating disconnect contact motion with operation of the auxiliary switch 41. Thus, the rotation of the arm 52, associated with the switch 41, indicates the position of the movable disconnect contact 11. As will be more apparent hereinafter upon a description of the control circuit involved, backlash between the two should be avoided as much as possible.

Figure 7:
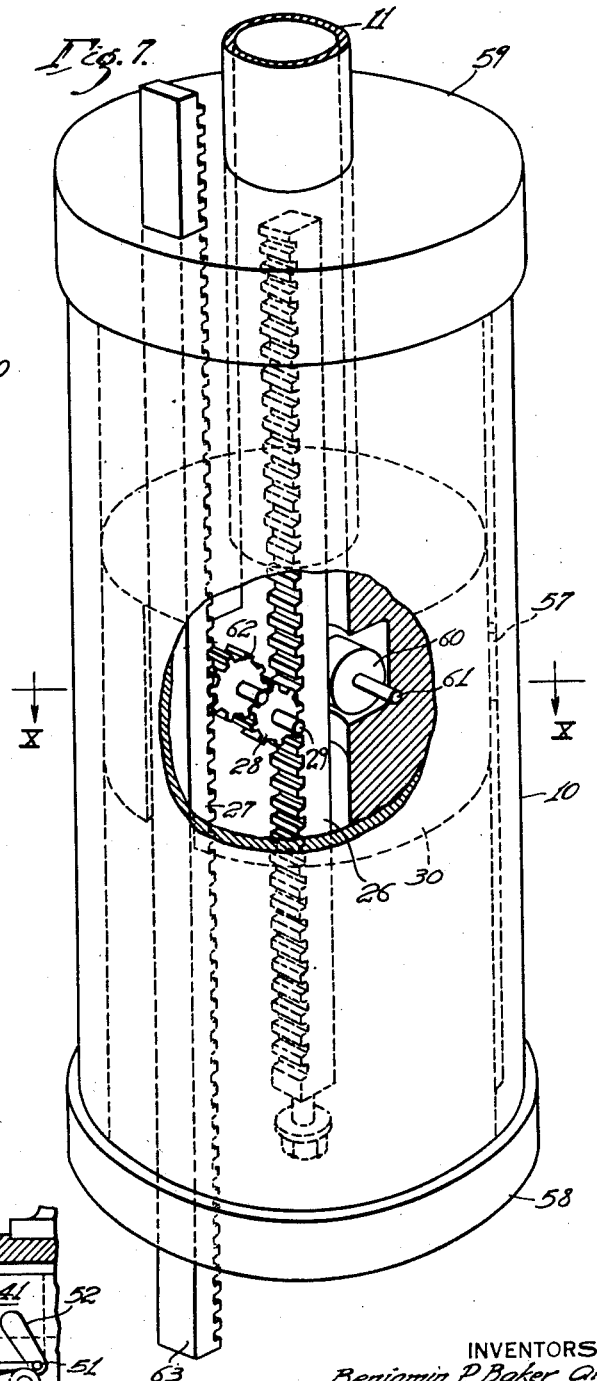
Fig. 7 is a perspective view illustrating a modification of our invention, the disconnect contact being approximately half way open.

In the modification of our invention shown in Fig. 7, the stationary gear rack 26 telescopes within the tubular disconnect contact 11 in the open position of the interrupter. The stationary rack 26 may be maintained fixedly in place with respect to the operating cylinder 10 by securing the lower end thereof to the lower cylinder head 58. The movable rack 27 is guided by the lower cylinder head 58 and the upper cylinder head 59 and slides along the interior wall of the operating cylinder 10. A roller 60 mounted on a pin 61 and movable with the piston 30 serves to assist in causing the stationary rack 26 to bear against the spur gear 28 which moves with the piston 30. The spur gear 28 meshes with a second spur gear 62, the latter making engagement with the movable rack 27. The linkage leading to the auxiliary switch 41 may be connected to the lower end 63 of the movable rack 27. The spur gears 28, 62 have the same pitch, that is, teeth per inch, so that the operation of this embodiment of our invention is identical to that previously described in connection with Fig. 2 of the drawings. This embodiment, however, utilizes a different structural disposition of the several parts so as to take the motion of the moving rack 27 off of the end of the operating cylinder 10 instead of at the side thereof as was the case in Fig. 2.

Fig. 8 illustrates another modification of our invention in which the differential gear means 25 as a unit telescopes within the tubular disconnect contact 11 in the open circuit position of the interrupter. The stationary rack 26 may be rigidly secured to the lower cylinder head 58 as was the case in Fig. 7. The movable rack 27 has a structural relation with respect to the stationary rack 26, the same as that employed in Fig. 2. A lever 64 pivotally supported on a pin 65, the latter being in turn supported by a bracket 66, may be employed to interrelate motion of the movable rack 27 with further linkage (not shown) leading to the auxiliary switch 41. The lever 64 may make a pivotal connection at 67 to the lower end of the movable rack 27.

Referring now to Fig. 9, which diagrammatically shows the circuits for electrically controlling the circuit interrupter, 68 and 69 designate a pair of supply conductors connected to a source of electrical energy (not shown). The winding of the solenoid 70, which controls the admission of compressed air to the operating cylinders for closing the contact members of the circuit interrupter, is connected in an energized circuit 71 extending from the supply conductor 68 through the winding of the solenoid 70 and front contacts 72 of a closing relay 73 to the supply conductor 69. The energizing winding of the closing relay 73 is connected in an energizing circuit which extends from the supply conductor 69 through a conductor 74, back contacts 75 of a release relay 76, energizing winding of the closing relay 73, conductor 77, conductor 78 and through a manual closing control switch 79 and conductor 80 to the supply conductor 68. A reclosing relay 81 has contacts 82 connected in shunt to the closing control switch 79. The reclosing relay 81 may be energized to automatically reclose the circuit interrupter in a manner well known in the art.

The energizing winding of the release relay 76 is connected in an energizing circuit which extends from the supply conductor 69 through a conductor 83 through an auxiliary switch 84, which is adapted to be closed when the disconnect contact member 11 of the circuit interrupter reaches closed position, through a conductor 85, energizing winding of the release relay 76, conductor 86 through front contacts 87 of the closing relay 73 and through a conductor 88 to the supply conductor 68.

A stick circuit is provided for maintaining the closing relay 73 energized after a momentary operation of the manual closing control switch 79 or the contacts 82 of the reclosing relay. This stick circuit extends from the supply conductor 69 through the conductor 74, back contacts 75 of the relay 76, conductor 89, energizing winding of the closing relay 73, conductor 77 and front contacts 87 of the closing relay and through conductor 88 to the supply conductor 68. A locking circuit is also provided for maintaining the release relay 76 energized after the disconnect contacts of the interrupter close and until the manual closing control switch 79 has been opened.

This locking circuit for the release relay 76 extend from the supply conductor 69 through conductor 74, front contacts 90 of release relay 76 through the winding of the release relay 76, conductor 78, manual closing control switch 79 and conductor 80 to the supply conductor 68. The purpose of this locking circuit is to prevent pumping of the circuit interrupter in the event that the circuit interrupter fails to remain closed and the manual closing control switch 79 is held by the operator in closed position.

The winding of the solenoid 91 for controlling the opening valve, which controls the flow of compressed air to the cylinder 8 for effecting opening operation of the circuit interrupter, and the winding of the solenoid 92, which controls opening of the blast valve 47, are connected in parallel in an energizing circuit which extends from the supply conductor 68 through a conductor 93, front contacts 94 of an opening relay 95, conductor 96, the energizing winding of the solenoids 91 and 92 in parallel, conductor 97 through auxiliary contact 98, which are open when the disconnect contact member is in open position, and through conductor 83 to the supply conductor 69. The branch or portion of the circuit including the winding of the solenoid 92 has a pair of auxiliary contacts 99 connected in series with the winding of solenoid 92, and these auxiliary contacts open as soon as the disconnect contact member 11 starts its opening movement, thereby deenergizing the solenoid 92 so that the blast valve returns to closed position.

The energizing winding of the opening relay 95 is connected in an energizing circuit which extends from the supply conductor 68 through conductor 80 through the contacts 100 of a protective relay 101 through conductor 102, energizing winding of opening relay 95, conductor 103 through auxiliary contacts 104, which are closed when the disconnect contact member is in closed position and which are opened when the disconnect contact member 11 reaches full open position, and through conductor 83 to the supply conductor 69.

The manual opening control switch 105 is connected in shunt to the contacts 100 of the protective relay for the purpose of manually controlling the opening of the circuit interrupter by energizing the opening relay over the circuit previously described.

A stick circuit is provided for maintaining the opening relay 95 energized after a momentary closing of the contacts 100 or 105 and until the disconnect contact member 11 reaches full open position. This stick circuit extends from the conductor 68 through a portion of conductor 93, front contacts 106 of the opening relay 95, energizing winding of the opening relay 95, conductor 103, auxiliary contacts 104 and conductor 83 to the supply conductor 69.

A circuit interrupter is adapted to be quickly automatically reclosed immediately following opening of the disconnect contact member 11 through the agency of the reclosing relay 81, providing the circuit of the reclosing relay is rendered operative by a manual control switch 107. If quick automatic reclosing is not desired, the manual switch 107 may be opened, thus rendering reclosing relay 81 inoperative.

The protective relay 101 may be of the current-overload type which is operative in response to an overload in the main circuit 108 controlled by the circuit interrupter. The operating coil of the protective relay 101 is adapted to be energized through the agency of a current transformer 109 associated with the main circuit conductor 108.

The operation of the circuit interrupter is as follows: Assuming the circuit interrupter to be in closed position as shown in Fig. 9 when a predetermined overload or short circuit occurs in the main circuit 108 controlled by the interrupter, the protective relay 101 is immediately energized and closes its contacts 100 to effect energization of the opening relay 95. The operation of the opening relay 95 completes the energizing circuit for the solenoid 91 of the opening valve mechanism and for the solenoid 92 of the blast valve mechanism 47. Compressed air from the tank 2 then flows through the opening valve, through conduit 110, through insulator column 4, through conduit 111 into the upper end of the operating cylinder 8 to effect downward movement of the piston 112 secured to the lower end of the movable arcing contact 9. This operates the movable arcing contact 9 to open position. At the same time, the flow of compressed air to the upper end of the operating cylinder 8 opens the dump valve 113, thereby connecting the lower ends of the operating cyinders 8, 10 to atmosphere. As soon as the arcing contact operating piston 112 has moved a predetermined distance in an opening direction, it uncovers a port connected to the conduit 114 to admit compressed air to the upper end of the disconnect operating cylinder 10 through the pipe 14. By the time the contact member 9 reaches full open position, the flow of compressed air into the operating cylinder 10 starts to move the piston 30 downwardly to open position, thereby effecting movement of the disconnect contact member 11 to open position, thereby completing the opening operation of the circuit interrupter. As soon as the disconnect contact member 11 starts its opening movement, the auxiliary contacts 99 open and deenergize the blast valve solenoid 92, thereby causing the blast valve to close.

As soon as the disconnect contact member 11 reaches full open position, the auxiliary contacts 104 open and effect deenergization of the opening relay 95, thereby effecting closing of the opening valve by deenergizing the solenoid 91 which controls this valve.

During the opening operation of the arcing contact 9, a blast of compressed air is directed to the arcing contacts 9, 17 in interrupting element 18 to quickly extinguish the arc drawn by these contacts. This blast valve returns to closed position, however, as soon as the disconnect contact member 11 starts to open.

The circuit interrupter is adapted to be quickly automatically reclosed immediately following an opening operation thereof through the agency of the reclosing relay 81, energization of which may be effected by auxiliary contacts (not shown) operated when the disconnect contact member 11 reaches open position. Closing of the reclosing relay contacts 82 completes an energizing circuit for the closing relay 73. When the closing relay 73 is energized, it completes its previously-described circuit for energizing the winding of the solenoid 70 of the closing valve mechanism, thereby opening the closing valve and admitting compressed air to the lower end of the operating cylinder 8. The flow of compressed air to the lower end of the operating cylinder immediately effects opening of the dump valve 115, which opens the upper ends of the cylinders 8, 10 to atmosphere. The compressed air admitted to the lower side of the piston 112 moves this piston upwardly to effect movement of the arcing contact member 9 to closed position. After the operating piston 112 is moved upwardly a predetermined distance, it uncovers the port which is connected by the conduit 116 to the lower end of the cylinder 10, thereby admitting compressed air to the lower end of the disconnect contact operating cylinder 10. After the arcing contact member 9 has reached closed position, the compressed air admitted to the lower side of the operating piston 30 effects movement of the piston upwardly thereby moving disconnect contact 11 to closed position. As soon as the disconnect contact member 11 reaches closed position, the auxiliary contacts 84 close and effect energization of the release relay 76. Energization of the release relay 76 effects deenergization of the closing relay 73 by opening of the contacts 75. The release relay 76 is then deenergized by the opening of the contacts 87 of the closing relay. When the closing relay 73 drops out, the solenoid 70 is deenergized and the closing valve returns to closed position.

If the fault condition which caused opening of the breaker has cleared by the time the disconnect contact member 11 reaches closed position, the circuit interrupter will remain closed. However, if the fault condition is still present upon closing of the disconnect contacts 11, 12, the protective relay 101 will again be energized and immediately effect opening operation in the manner previously described. A lockout device may be provided in the automatic reclosing circuit to limit the number of automatic reclosing operations to one or any other number in a manner well known in the art.

Since the main conductor circuit may be completed slightly before the disconnect contact member reaches the fully closed position, fault responsive relay 101 may be energized prior to complete closing of the interrupter if a fault condition is present in the main circuit. Under such conditions, the opening relay effects opening of the valve mechanism and this will result in quick reversal of the switch mechanism from closing to opening due to the fact that the opening and closing valves are interlocked in a manner described in application Serial No. 431,394, whereby an opening impulse will always take precedence over a closing impulse.

It will be apparent from the description of the control circuit that it is important for the auxiliary switch 41 to indicate the position of the movable disconnect contact 11 with as little back-lash as possible. It will be apparent from the three modifications described that the system described by our invention has the following advantages. Since the friction is largely the rolling friction of the gear teeth, it is much less than the friction involved in other types of mechanism. Also since the friction is not as dependent on the loading, the loading can be greater. There is only the small amount of back-lash encountered in ordinary gear drives and, therefore, the reduction ratio has a lower minimum. This allows a greater amount of travel of the auxiliary linkage than obtained by other constructions, which results in a lower ratio of back-lash to auxiliary switch operating travel.

Although we have shown and described specific structures, it is to be clearly understood that the same are merely for purposes of illustration and that changes and modifications may be readily made therein by those skilled in the art without departing from the spirit and scope of the appended claims.

We claim as our invention:

1. In a circuit interrupter of the gas-blast type, a pair of cooperable contacts, a piston directly connected to one of the contacts to cause axial movement thereof, an operating cylinder within which the piston operates, a switch to be actuated in accordance with the position of the one contact, differential gear means disposed within and extending longitudinally along the wall of the operating cylinder and reciprocably actuated by said piston, and means connecting said differential gear means and said switch for actuating said switch in accordance with the motion of said one contact.

2. In a circuit interrupter of the gas-blast type, a pair of current-interrupting contacts, a pair of disconnect contacts connected in series therewith, an operating cylinder, a piston directly connected to one of the disconnect contacts and movable within the operating cylinder, a switch to be actuated in accordance with the position of said one disconnect contact, and differential gear means extending longitudinally within the operating cylinder and reciprocably actuated by said piston, and a linkage operated by said differential gear means to actuate said switch according to the motion of said one disconnect contact.

3. In a circuit interrupter, a contact, a piston secured to the contact, auxiliary switch means, an operating cylinder within which the piston moved, differential gear means extending longitudinally along the inner wall of the operating cylinder, the differential gear means comprising a stationary rack and a movable rack, a spur gear engaging both of said racks and movable with the piston and means operated by said differential gear means for actuating said auxiliary switch means.

4. In a circuit interrupter, a tubular contact, a piston secured to the contact, auxiliary switch means, an operating cylinder within which the piston operates, a fixed rack which telescopes within the tubular contact in the open position of the interrupter, a movable rack movable along the inner wall of the operating cylinder, spur gear means movable with the piston and engageable with both racks for operating said movable rack, and a linkage operated by said movable rack for actuating said auxiliary switch means.

5. In a circuit interrupter, a tubular contact, a piston secured to the contact, auxiliary switch means, an operating cylinder within which the piston operates, differential gear means comprising a stationary rack and a movable rack both telescoping within the tubular contact in the open position of the interrupter, a spur gear movable with the piston and engageable with both racks for moving said movable rack, and means coupling said auxiliary switch to said movable rack for actuating said auxiliary switch upon movement of said piston.

6. In a circuit interrupter of the gas blast type comprising current interrupting contact means, a reciprocably movable disconnect contact, operating means comprising an operating cylinder and a piston movable therein for actuating said disconnect contact mechanically independently of said interrupting contact means, auxiliary switch means, differential gear means comprising a stationary rack and a movable rack disposed within said operating cylinder, a gear meshing with both of said racks, said gear being mounted on said piston and reciprocably movable with said disconnect contact, and means actuated by said movable rack for operating said auxiliary switch means in accordance with the movement of said disconnect contact.

7. In a circuit interrupter of the gas blast type comprising interrupting contact means, reciprocably movable disconnect contact means connected in series relation with said interrupting contact means, operating means for said interrupting contact means, separate operating means for moving said disconnect contact means to open and closed position comprising an operating cylinder and a piston movable therein, auxiliary switch means, means for operating said auxiliary switch means comprising a fixed rack and a movable rack, both of said racks being disposed within said cylinder, a gear common to both of said racks movable with said piston for actuating said movable rack, and means actuated by said movable rack for operating said auxiliary switch means according to the movement of said disconnect contact means.

BENJAMIN P. BAKER.
HERBERT J. WEBB.

REFERENCES CITED

The following references are of record in the file of this patent:

UNITED STATES PATENTS

| Number | Name | Date |
| --- | --- | --- |
| 1,883,163 | Voorhis | Oct. 18, 1932 |
| 2,001,180 | Buckner | May 14, 1935 |
| 2,282,153 | Baker et al. | May 5, 1942 |